United States Patent [19]

Bryan-Brown et al.

[11] Patent Number: 5,764,325
[45] Date of Patent: Jun. 9, 1998

[54] LIQUID CRYSTAL DEVICE ALIGNMENT

[75] Inventors: Guy Peter Bryan-Brown; Damien Gerard McDonnell; Michael John Towler, all of Malvern, Great Britain

[73] Assignee: The Secretary of State for Defence in Her Britannic Majesty's Government of the United Kingdom of Great Britain and Northern Ireland, Hants, United Kingdom

[21] Appl. No.: 693,092

[22] PCT Filed: Jan. 30, 1995

[86] PCT No.: PCT/GB95/00180

§ 371 Date: Oct. 3, 1996

§ 102(e) Date: Oct. 3, 1996

[87] PCT Pub. No.: WO95/22078

PCT Pub. Date: Aug. 17, 1995

[30] Foreign Application Priority Data

Feb. 9, 1994 [GB] United Kingdom ............... 9402492

[51] Int. Cl.⁶ ............... G02F 1/1337; G02F 1/41; G02F 1/13
[52] U.S. Cl. ............... 349/123; 349/134; 349/128; 349/201
[58] Field of Search ............... 349/123, 134, 349/201, 128

[56] References Cited

U.S. PATENT DOCUMENTS

| | | | |
|---|---|---|---|
| 4,232,947 | 11/1980 | Funada et al. | 349/123 |
| 4,521,080 | 6/1985 | Funada et al. | 349/123 |
| 4,751,509 | 6/1988 | Kubota et al. | 349/201 |
| 4,834,500 | 5/1989 | Hilsum et al. | 349/201 |
| 4,850,682 | 7/1989 | Gerritsen | 349/201 |

FOREIGN PATENT DOCUMENTS

| | | |
|---|---|---|
| 2 166 562 | 5/1986 | United Kingdom. |
| WO A 7901025 | 11/1979 | WIPO. |

OTHER PUBLICATIONS

Journal of Applied Physics, vol.52, No.1, Jan. 1981, New York US pp. 210–218, Nakamura M et al Alignment of nematic liquid crystals on ruled grating surfaces.

Society for Information Display, International Symposium, Digest of Technical Papers, vo. XXIV, 1993 pp. 957–960, XP000470785, E.W. Lee et al 'Control of the LC alignment using a stamped morphology method and its application to LCDs'.

*Primary Examiner*—William L. Sikes
*Assistant Examiner*—Toan Ton
*Attorney, Agent, or Firm*—Nixon & Vanderhye P.C.

[57] ABSTRACT

A twisted nematic type of liquid crystal device comprises two cell walls enclosing a layer of a nematic or long pitch cholesteric liquid crystal material. The device has both an alignment direction and a surface tilt provided by an asymmetric grooves structure alignment on one or both walls. The alignment treatment may be provided by a shaped layer of a photolithographic material. Embossing, ruling, or transferred from a carrier layer material may alternatively provide the alignment. The amount of twist may be multiples of about 90° and the device arranged between two polarisers.

21 Claims, 3 Drawing Sheets

LIQUID CRYSTAL DEVICE ALIGNMENT

BACKGROUND OF THE INVENTION

1. Field of the Invention

This invention relates to liquid crystal device alignment. Such devices typically comprise a thin layer of a liquid crystal material contained between cell walls. Optically transparent electrode structures on the walls allow an electric field to be applied across the layer causing a re-ordering of the liquid crystal molecules to an ON state. On removing the electric field the molecules relax back to their OFF state.

2. Discussion of Prior Art

There are three known types of liquid crystal material, nematic, cholesteric, and smectic each having a different molecular ordering.

The present invention concerns devices using nematic or long pitch cholesteric materials and a surface alignment treatment to the cell walls. This surface alignment aligns liquid crystal molecules in contact with the wall in an alignment direction. By arranging these alignment directions orthogonal the liquid crystal is forced to adopt a twisted structure in its voltage OFF state. This device is known as a twisted nematic device. Addition of a small amount of cholesteric material to the nematic material imparts a preferred twist direction to ensure a uniform twist in the device. Also devices can be made with angles of twist greater than 90°; eg the super twisted nematic device, or 270° twisted nematic device described in U.S. Pat. No. 4,596,446. Another requirement for the alignment treatment is that it should also impart a surface tilt to liquid crystal molecules at the cell wall. Such a surface tilt is necessary in some devices to ensure a uniform display as described eg in GB-1,472,247, and 1,478,592.

In order to provide displays with a large number of addressable elements it is common to make the electrodes as a series of row electrode on one wall and a series of column electrodes on the other cell wall. These form eg an x.y matrix of addressable elements or pixels, and are commonly addressed using rms addressing methods. Due to material and device parameters there is an upper limit to the number of pixels that can be multiplex addressed. One way of improving the number of pixels is to incorporate thin film transistors adjacent each pixel; such displays are termed active matrix displays.

One method of providing alignment is termed a rubbing process where a cell wall, with or without a polymer layer, is unidirectionally rubbed by a soft cloth. Liquid crystal molecules align along the rubbing direction, usually with a surface tilt of about 2° or more depending upon the polymer layer. A disadvantage of the rubbing process is that it can generate dust which degrades the yield of the display and also causes electrostatic and mechanical damage to thin film transistors already formed on the cell wall.

Another alignment technique is known as oblique evaporation of eg SiO, which can produce surface tilts of zero, or high tilt eg 30° depending upon evaporation direction angle. Such a technique is cumbersome for large scale manufacture; but a more important problem is that it is difficult to provide a uniform alignment direction and surface tilt over large areas of cell walls.

For these reasons it is highly desirable to develop non-rubbing alignment techniques. Such alignments have included the use of the Langmuir Bloggett technique (H Ikeno et al Japan J Appl Phys Vol 27, pp 495, 1988); application of magnetic field to the substrate (N Koshida and S Kikui, Appl Phys Lett vol 40, pp 541, 1982); or the use of polymers films having optical anisotropy induced by mechanical drawing (H. Aoyama et al Mol Cryst Liq Cryst vol 72 pp 127, 1981); or by irradiation of polarised light (M Schadt et al Japan J Appl Phys vol 31 pp 2155, 1992). Also twisted nematic structures have been made in which only one surface is rubbed (Y Toko et al Japan Display 92 491).

Short pitch cholesteric materials, forming thermochromic displays, have been aligned by grating structures embossed into plastic cell walls; this is described in GB-2,143,323 (McDonnell 1983). A previous use of gratings to obtain pretilted alignment has utilised a blazed grating crossed with a sinusoidal grating (E S Lee et al SID 93 Digest, 957). The liquid crystal director then runs along the groove of the sinusoidal grating and hence runs over the blazed grooves which leads to pretilt.

SUMMARY OF THE INVENTION

According to this invention both an alignment direction and a surface tilt is provided by a single blazing for a twisted nematic type of device; eg devices with twists of 45°, 90°, 180°, 270°, 360° or more, or twists of intermediate angles.

According to this invention a twisted nematic device comprises:

two cell walls enclosing a layer of liquid crystal material;

electrode structures on both wall;

a surface alignment on both cell walls providing both an alignment direction and a surface tilt to liquid crystal molecules;

the cell walls being arranged so that the alignment directions are at a non zero angle to one another;

CHARACTERISED BY a grating on at least one cell wall to provide a surface alignment direction, such grating having grooves with an asymmetric profile.

the liquid crystal material layer having a cholesteric pitch and thickness that provides a twist angle not equal to the angle between surface alignment directions on the cell walls, whereby the grating alignment in combination with elastic twist constants of the liquid crystal material provide both alignment and a non zero surface tilt to the liquid crystal material.

The asymmetric alignment may have the approximate cross sectional shape of a sawtooth waveform.

The asymmetric alignment surface may be defied as a surface for which there does not exist a value of h such that:

$$Y(h-x)=Y(h+x) \tag{1}$$

for all values of x, where Y is the function describing the surface amplitude.

The asymmetric structure may cover the whole or part of a cell wall, or the whole or part of each pixel. Furthermore, the alignment directions may be different in different areas of a pixel or on adjacent pixels.

The cell may be arranged between two coloured or neutral polarisers, both with or without a small amount of a pleochroic (eg D 82 Merck) in the liquid crystal material. The polarisation axis of the polarisers, the layer thickness, and the material birefringence may be arranged to optimise display constrast between ON and OFF states. For example the polarisers optical axis may be up to a few degrees away from being parallel or perpendicular to an adjacent alignment directions; and the device operated in a Gooch and Tarry minimum. (J Phys D Appl Phys Vol 8 1975, pp 1575–1584).

One or both cell walls may be formed of a relatively thick now flexible material such as a glass, or one or both cells walls may be formed of a flexible material such as a thin layer of glass or a plastic material eg polypropylene. A plastic cell wall may be embossed on its inner surface to provide a grating. Additionally, the embossing may provide small pillars (eg of 1–3 μm height and 5–50 μm or more width) for assisting in correct spacing apart of the cell walls and also for a barrier to liquid crystal material flow when the cell is flexed. Alternatively the pillars may be formed by the material of the alignment layers.

BRIEF DESCRIPTION OF THE DRAWINGS

The invention will now be described, by way of example only, with reference to the accompanying drawing of which.

DETAILED DISCUSSION OF PREFERRED EMBODIMENTS

Figure 1:
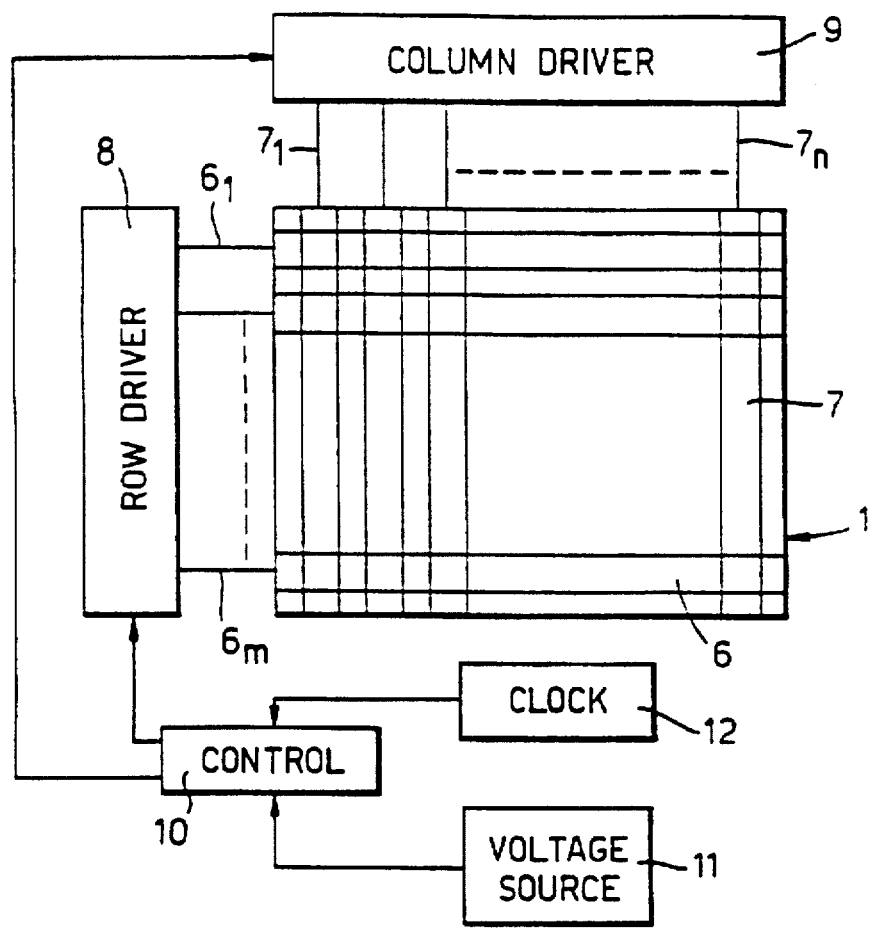
FIG. 1 is a plan view of a matrix multiplex addressed liquid crystal display.
Figure 2:
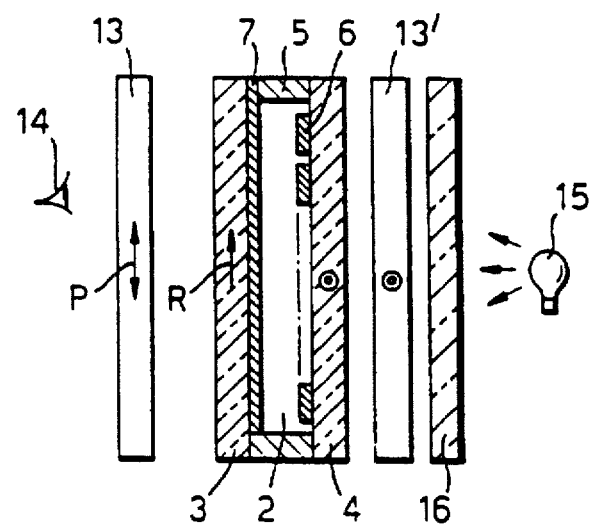
FIG. 2 is a cross section of the display of FIG. 1.

The display of FIGS. 1, 2 comprises a liquid crystal cell 1 formed by a layer 2 of cholesteric liquid crystal material contained between glass walls 3, 4. A spacer ring 5 maintains the walls typically 6 μm apart. Additionally numerous short lengths of 6 μdiameter glass fibre may be dispersed in the liquid crystal material to maintain an accurate wall spacing. Strip like row electrodes 6 eg of SnO2 or ITO are formed on one wall 3 and similar column electrodes 7 formed on the other wall 4. With m-row and n-column electrodes this forms an m.n matrix of addressable elements or pixels. Each pixel is formed by the intersection of a row and column electrode.

A row driver 8 supplies voltage to each row electrode 6. Similarly a column driver 9 supplies voltages to each column electrode 7. Control of applied voltages is from a control logic 10 which receives power from a voltage source 11 and timing from a clock 12.

Either side of the cell 1 are polarizers 13, 13' arranged with their polarisation axis crossed with respect to one another and parallel to an alignment direction on the adjacent wall 3, 4 as described later.

A partly reflecting mirror 16 may be arranged behind the cell 1 together with a light source 15. These allow the display to be seen in reflection and lit from behind in dull ambient lighting. For a transmission device, the mirror may be omitted.

Figure 3:
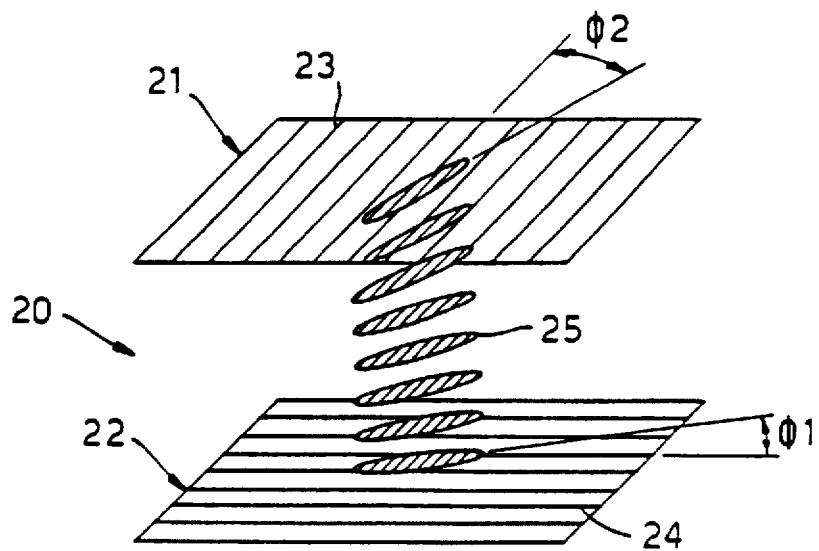
FIG. 3 is a stylised view showing alignment and twist across a liquid crystal cell.

FIG. 3 shows a structure consisting of a nematic liquid crystal layer 20 between two gratings 21, 22 having orthogonally aligned grooves 23, 24. Local direction of liquid crystal molecules (the director) is indicated at 25. For very deep grooved gratings (ie strong azimuthal anchoring energies) the liquid crystal director 25 at each surface lies along the groove direction. However, for shallower (or longer pitch) gratings, the director 25 at the surfaces is twisted off from the groove directions 23, 24 (by $\phi_1$ and $\phi_2$) due to the relatively large bulk twist energy as shown in FIG. 3. If the grooves are blazed (asymmetric) then this twisting off is accompanied by surface pretilt which is vital for practical displays to prevent reverse tilt disclinations. In this context a blazed surface is defined above as a surface of formula (1).

The gratings 21, 22 may cover the entire surface of a cell wall, or may cover all or part of each pixel, or may extend slightly beyond the boundary of the pixels. The gratings may be at the pixel areas of a complete layer of grating material with the areas between pixels coated with a polymer whose surface contains no grating. Alternatively the gratings at the pixels may be separate areas of a grating with no grating polymer between the pixels. Areas between pixels with on grating may be used to improve contrast ratio between ON and OFF states of a display, because these non-grating areas will appear black in a normally white twisted nematic display. This dispenses with the need to apply a black coloured pattern to cell walls between electrodes, as formed on some present displays.

The direction of the grooves at each pixel may be different in different parts of the pixel, or between adjacent pixels, eg two half pixels with grooves orthogonal to one another. Furthermore, the asymmetry of the grooves and or depth of groove may be varied within a pixel area (and hence surface pretilt and twist) to allow additional grey scale capability, particularly for STN devices (twist angles between 180° and 360°, eg 270°). This sub-pixellation may be used to improve viewing angle of a display.

The zenithal anchoring energy may be independently controlled by varying the grating material or its processing, and or by use of a surfactant (eg lethecin) on the grating surface.

Figure 4:
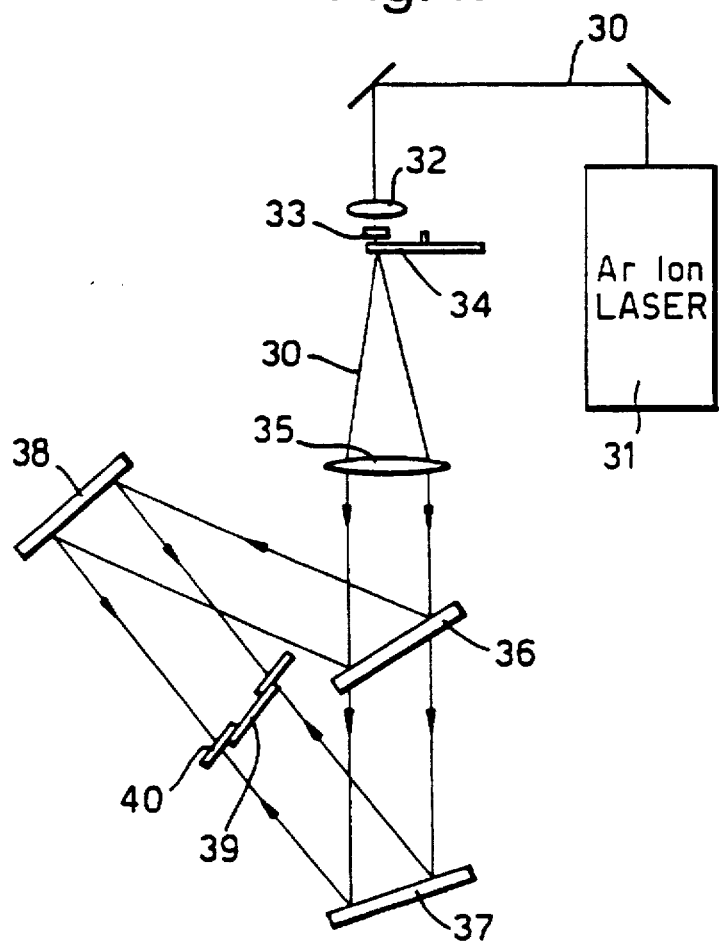
FIG. 4 is a diagrammatic view of apparatus for producing the asymmetric alignment.

FIG. 4 shows apparatus for producing a grating. As shown light 30 from an argon ion laser 31 (of wavelength 457.9 nm) is focused by a first lens 32 onto a fixed diffuser 33 and a rotating diffuser 34. A second lens 35 recollimates the now expanded laser beam 30 which is then amplitude split by a semi aluminised beamsplitter 36 onto two mirrors 37, 38. A substrate 39 to be formed into a grating is mounted in a sample holder 40 located between the two mirrors 37, 38. The counterpropagating beams in between the two mirrors 37, 38 set up an optical standing wave, ie interference fringes, having a period of half the laser wavelength.

Prior to being mounted in the sample holder 40 a substrate 39 of indium tin oxide (ITO) coated glass is cleaned in acetone and isopropanol and then spin coated with a photopolyimide (Ciba Geigy 343) at 4000 rpm for 30 seconds to give a coating 41 thickness of 3.5 μm. Softbaking is carried out at 80° C. for 15 minutes followed by a further 15 minutes at 100° C. The substrate 39 is then mounted in the sample holer 40 as in FIG. 4 and exposed at an oblique angle to a standing wave pattern of light from the argon ion laser 31. This is a specific example of interferographic grating manufacture. M C Hutley, Diffraction Gratings (Acedemic Press, London 1982) pp 95–125.

Figure 5:
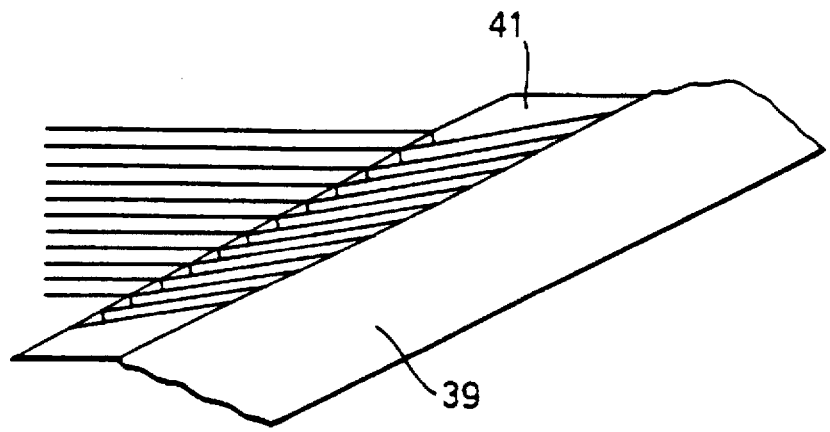
FIG. 5 is a section view of a cell wall being treated by the apparatus of FIG. 4.

The interference fringes are recorded into the photopolymer layer 41 as shown in FIG. 5. The pitch of the grating depends on the angle between the substrate 39 and the standing wave. Typical exposure is 300 seconds with a power density at the sample of 1.5 mW/cm². After a post exposure bake (105° C. 5 minutes) the sample is spin developed for 15 seconds in QZ3301 (Ciba Geigy) and then rinsed in QS3312 for 15 seconds.

The above process is a specific example of interferographic grating manufacture as described in M C Hutley, Diffraction Gratings (Acedemic Press, London, 1982, pp 95–125). Gratings are also described in GB-2166562-A, CANON; U.S. Pat. No. 4,521,080, FUNADA; and U.S. Pat. No. 4,232,947, FUNADA.

EXAMPLE 1

Two gratings were made by the method described with reference to FIGS. 4, 5 and arranged with the groove directions orthogonal; a spacer held the gratings 10 μm apart. The resulting 10 μm thick cell was filled with a commercial mixture E7 (Merck). Due to the weak azimuthal anchoring of the gratings, the nematic was found to align such that $\phi_1=\phi_2=45°$ (see FIG. 3). A pretilt of 1.2° was measured at each surface by the crystal rotation method described in G Baur et al Phys Lett vol 56a pp 142, (1976). A subsequent atomic force microscopic (AFM) study of one of the surfaces showed it to have a skewed sinusoidal profile with maximum facets of 9.1° on one side of each groove and 7.5° on the other side. Hence it has been shown that an asymmetric monograting will induce pretilt into a nematic as long as the director lies at a finite angle to the grooves.

Figure 6:
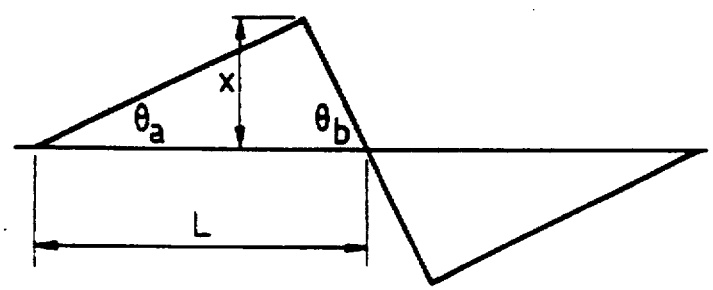
FIG. 6 is a stylised cross section of an aligned layer.

It can also be shown by a simplified theoretical argument with reference to FIG. 6 that a blazed grating will induce pretilt.

Assume uniform director field above a blazed grating at some angle $O_p$ to the surface such that the surface anchoring energy is minimised (ie ignore bulk energy):

Let the surface be defined as shown with facet angles of $\theta_a$ and $\theta_b$, amplitude x, pitch 2L and molecular surface tilt $\theta_p$. The surface anchoring energy is given by:

$$F = \frac{\gamma}{2L}\left[\frac{x}{\sin\theta_a}\sin^2(\theta_p - \theta_a) + \frac{x}{\sin\theta_b}\sin^2(\theta_p + \theta_b)\right]$$

Minimising with respect to $\theta_p$ gives;

$$\tan2\theta_p = \frac{2\sin\theta_a\sin\theta_b(\cos\theta_a - \cos\theta_b)}{(\sin\theta_a + \sin\theta_b)(1 - 2\sin\theta_a\sin\theta_b)}$$

let $\theta_b=\pi/2$, ie make one of the facets vertical. The above solution then reduces to:

$$\tan2\theta_p = \frac{\sin2\theta_a}{\cos2\theta_a - \sin\theta_a}$$

Figure 7:
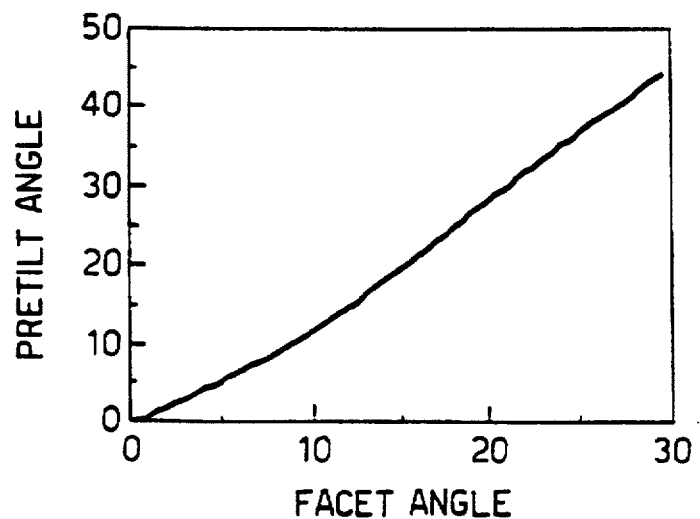
FIG. 7 is a graph of liquid crystal surface tilt against facet angle of an alignment layer.

This equation is plotted in FIG. 7 and shows that pretilt has a roughly linear dependence on $\theta_a$ and is always larger than $\theta_a$. Therefore this simple theory has confirmed that finite pretilt is induced by an asymmetric groove profile.

In the experimental example, the liquid crystal formed almost uniform state at approximately 45° to the grating grooves. To obtain a full 90° twisted structure, the liquid crystal is doped with a chiral additive (to prevent reverse twist) and the grooves are placed at an angle greater than or less than 90° to each other. The asymmetry of the grooves (and hence pretilt) along with the chiral doping can be increased allowing an STN (270° twisted) structure to be made. Gratings in the experimental example had a pitch of 1.6 μm, however a wide range of pitches can be used.

The arrangement in FIG. 4 can make any pitch of grating greater than 0.23 μm (half the laser wavelength) but smaller pitches could be made with ultraviolet lasers. The azimuthal alignment energy per unit area for a sinusoidal grating has been calculated (D W Berreman, Phys Rev Lett, 28, 1683 (1972)) as $U=2\pi K_{11}(a^2/L^3)$ where a is the grating amplitude (half the peak to trough grooves depth) and L is the pitch. In terms of liquid crystal alignment, a useful grating must have a profile such that U is greater than the thermal randomisation energy and greater than the energy associated with any other surface irregularity or material inhomogeneity. Further, small pitches are preferred to obtain sufficient energy because if a is too large then a large voltage drop will occur across the grating when a field is applied to the cell.

Gratings suitable for these configurations can also be fabricated using carrier layer transfer, photolithography (F Horn, Physics World 33 (March 1993), embossing (M T Gale et al, J Appl Photo Eng vol 4, pp 2, 41 (1978)), or ruling (E G Loewen and R S Wiley, Proc SPIE vol 815, pp 88 (1987)).

We claim:

1. A twisted nematic device comprising:

two cell walls enclosing a layer of liquid crystal material;
   electrode structures on both walls;
   a surface alignment on both cell walls providing both a surface alignment direction and a surface tilt to liquid crystal molecules,
   the cell walls being arranged so that the surface alignment directions are at a non zero angle to one another;
   a grating on at least one cell wall to provide a surface alignment direction, such grating having grooves with an asymmetric profile;
   the liquid crystal material layer having a cholesteric pitch (p) and thickness (d) that provides a twist angle not equal to the angle ($\Phi$) between surface alignment directions on the cell walls ($\Phi \neq 2\pi d/p$), whereby the grating alignment in combination with elastic twist constants of the liquid crystal material provide both alignment and non zero surface tilt ($\theta_p$, $\theta_p \neq 0$) to the liquid crystal material.

2. The device of claim 1 wherein the cholesteric pitch and asymmetric groove structure alignment directions are arranged so that the liquid crystal twists through an angle less than the angle between the alignment directions.

3. The device of claim 1 wherein the cholesteric pitch and asymmetric groove structure alignment directions are arranged so that the liquid crystal twists through an angle more than the angle between the alignment directions.

4. The device of claim 1 wherein the asymmetric groove structure alignment has the approximate cross sectional shape of a sawtooth waveform.

5. The device of claim 1 wherein the asymmetric groove structure alignment is formed at electrode intersections forming pixels, with gaps containing no alignment.

6. The device of claim 1 wherein the asymmetric groove structure alignment direction is different in different areas of each pixel or at adjacent pixels.

7. The device of claim 1 wherein the asymmetry of the asymmetric groove structure alignment is different in different areas of each pixel or at adjacent pixels.

8. The device of claim 1 wherein the depth of grooves in the asymmetric groove structure alignment is different in different areas of each pixel or at adjacent pixels.

9. The device of claim 1 wherein the asymmetric groove structure alignment is coated with a surfactant.

10. The device of claim 4 wherein the asymmetric groove structure alignment is such that $a^2/L^3 > 300$ m$^{-1}$, where a is grating amplitude and L is grating pitch.

11. The device of claim 1 wherein the asymmetric groove structure alignment is such that $da^2/L^3 > 0.03$ where d=layer thickness, a is grating alignment, and L is grating pitch.

12. The device of claim 1 wherein the asymmetric groove structure alignment is formed in a layer of photolithographic material.

13. The device of claim 1 wherein the asymmetric groove structure alignment is formed in a layer of embossed material.

14. The device of claim 1 wherein the asymmetric groove structure alignment is formed by a layer of ruled material.

15. The device of claim 1 wherein the asymmetric groove structure alignment is transferred from a carrier layer material.

16. The device of claim 1 arranged between two polarisers, arranged with their axis of polarisation at an angle to the alignment directions so that contrast between device ON and OFF states is optimised.

17. The device of claim 1 wherein an amount of pleochroic dye is added to the liquid crystal material.

18. The device of claim 1 wherein the cell walls are formed of a glass material.

19. The device of claim 1 wherein the cell walls are formed of a flexible plastic material.

20. The device of claim 1 wherein spacer pillars are formed on one or both cell walls.

21. The device of claim 1 wherein spacer pillars are formed by the material forming the grating on one or both cell walls.

* * * * *